US012594935B2

(12) United States Patent
Shahriari et al.

(10) Patent No.: US 12,594,935 B2
(45) Date of Patent: Apr. 7, 2026

(54) PREDICTIVE VARIABLE VELOCITY MODEL-BASED LATERAL CONTROL FOR ROBUST AUTOMATED DRIVING

(71) Applicant: GM Global Technology Operations LLC, Detroit, MI (US)

(72) Inventors: Mohammadali Shahriari, Markham (CA); Reza Zarringhalam, Whitby (CA); Mohammed Raju Hossain, Markham (CA); Ashraf Abualfellat, Grand Blanc, MI (US); Brian Porto, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 18/656,977

(22) Filed: May 7, 2024

(65) Prior Publication Data

US 2025/0346225 A1     Nov. 13, 2025

(51) Int. Cl.
| | |
|---|---|
| *B60W 30/12* | (2020.01) |
| *B60W 10/20* | (2006.01) |
| *B60W 30/14* | (2006.01) |
| *B60W 50/00* | (2006.01) |

(52) U.S. Cl.
CPC ............ *B60W 30/12* (2013.01); *B60W 10/20* (2013.01); *B60W 30/143* (2013.01); *B60W 50/0097* (2013.01); *B60W 2050/0012* (2013.01); *B60W 2520/10* (2013.01); *B60W 2520/14* (2013.01); *B60W 2540/18* (2013.01); *B60W 2552/30* (2020.02)

(58) Field of Classification Search
CPC .... B60W 30/12; B60W 10/20; B60W 30/143; B60W 50/0097; B60W 2050/0012; B60W 2520/10; B60W 2520/14; B60W 2540/18; B60W 2552/30
See application file for complete search history.

(56) References Cited

U.S. PATENT DOCUMENTS

| | | | | |
|---|---|---|---|---|
| 9,731,755 | B1 * | 8/2017 | Moshchuk | ............... B62D 6/04 |
| 10,384,716 | B2 * | 8/2019 | Tokoro | .................. B60W 30/10 |
| 2017/0233001 | A1 * | 8/2017 | Moshchuk | ............... B62D 6/00 |
| | | | | 701/42 |
| 2018/0057053 | A1 * | 3/2018 | Tokoro | .................. B60W 10/20 |
| 2018/0297638 | A1 * | 10/2018 | Fujii | ..................... B60W 30/12 |
| 2018/0345959 | A1 * | 12/2018 | Fujii | ................. B60W 30/0953 |
| 2018/0346027 | A1 * | 12/2018 | Fujii | ..................... B60K 35/28 |

FOREIGN PATENT DOCUMENTS

DE          3830747 A1     3/1990

* cited by examiner

*Primary Examiner* — Sizo B Vilakazi
(74) *Attorney, Agent, or Firm* — Vivacqua Crane, PLLC

(57) ABSTRACT

A method for vehicle lane centering includes determining a speed profile over a predetermined period of time to maintain a predetermined speed while a vehicle moves within a lane of a road. The road has a road curve. The predetermined period of time includes a current time and a future time. The method further includes determining a curvature of a vehicle path along the road curve of the road and determining an error of a steering angle command using the speed profile and the curvature of the vehicle path along the road curve of the road. Further, the method further includes determining a variable velocity feedforward control command using the error on the steering angle command and controlling the vehicle using the variable velocity feedforward control command.

8 Claims, 3 Drawing Sheets

PREDICTIVE VARIABLE VELOCITY MODEL-BASED LATERAL CONTROL FOR ROBUST AUTOMATED DRIVING

INTRODUCTION

The present disclosure relates to methods and systems for predictive variable velocity model-based lateral control.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Lateral control methods are designed under the assumption that the vehicles are traveling at a constant longitudinal velocity. However, field data suggest that, when a vehicle accelerates or decelerates along a road curve, the lane centering control performance degrades. As a consequence, a vehicle may start to oscillate within the lane or depart from the lane. It is therefore useful to develop a method and a system that maintains the vehicle centered (without oscillating) in a lane when the vehicle accelerates or decelerates.

SUMMARY

The present disclosure describes a method for vehicle lane centering. The method includes determining the speed profile of the vehicle over a predetermined period of time to maintain a predetermined speed while a vehicle moves within a lane of a road. The road has a road curve. The predetermined period of time includes a current time and a future time. The method includes determining a curvature of a vehicle path along the road curve of the road and determining an error of a steering angle command using the speed profile and the curvature of the vehicle path along the road curve of the road. The method includes determining a variable velocity feedforward control command using the error on the steering angle command. The method includes controlling the vehicle using the variable velocity feedforward control command to maintain the vehicle traveling along a center of a lane when the vehicle is traveling along the road curve. The method described in this paragraph improves vehicle technology by maintaining the vehicle centered in the lane when the vehicle moves along the road curve.

The variable velocity feedforward control command may be calculated using the following equation:

$$\delta_{FF,\dot{v}} = \Delta v \rho_{ref} \left( v \ K_{us} - \frac{(l_f^2 + l_r^2)}{2L(\Delta v + v)} \right)$$

$\delta_{FF,\dot{v}}$ is the variable velocity feedforward control command;

$\rho_{ref}$ is the reference curvature of a vehicle path along the road curve of the road or desired path;

v is a velocity of the vehicle;

$\Delta v$ is a velocity difference between a first velocity of the vehicle at a first point in time and a second velocity of the vehicle at a second point in time;

$K_{us}$ is the understeer coefficient of the vehicle;

$l_r$ is a distance from a center of gravity of the vehicle to a rear axle of the vehicle;

$l_f$ is a distance from a center of gravity of the vehicle to a front axle of the vehicle; and L is a distance from the front axle to the rear axle of the vehicle.

The understeer coefficient of the vehicle may be calculated as function of a yaw rate of the vehicle at the current time. The method may include adjusting the speed of the vehicle over the predetermined period of time to maintain a predetermined headway. The method may include using a Model Predictive Control to determine a vehicle path over a predetermined period of time. The Model Predictive Control is iteratively updated with the variable velocity feedforward control command. The method may include determining a steering control command using the variable velocity feedforward control command to maintain the vehicle traveling along the center of the lane when the vehicle is traveling along the road curve.

The present disclosure also describes a control system for lane centering. The control system includes one or more sensors and a controller in communication with the sensors. The controller may be programmed to execute the method described above.

The present disclosure also describes a vehicle including a vehicle body, one or more sensors, and a controller in communication with the sensors. The sensors are coupled to the vehicle body. The controller may be programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
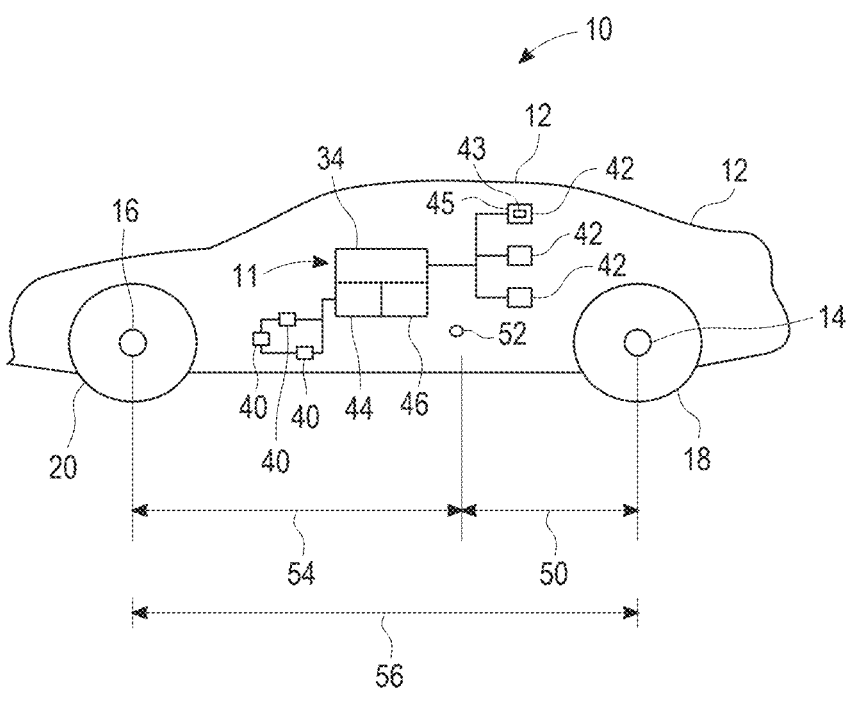
FIG. 1 is a schematic side view of a vehicle including a system for predictive variable velocity model-based lateral control.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a control system 11. While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a coupe, it is envisioned that that vehicle 10 may be another type of vehicle, such as a pickup truck, a sedan, a sport utility vehicle (SUVs), a recreational vehicle (RVs), etc. The system 11 can be used for accurate estimation of tire longitudinal and lateral forces.

Further, the vehicle 10 includes a vehicle controller 34 and one or more sensors 40 in communication with the vehicle controller 34. The sensors 40 collect information and generate sensor data indicative of the collected information. As non-limiting examples, the sensors 40 may include Global Navigation Satellite System (GNSS) transceivers or receivers, inertial measurement unit (IMU), yaw rate sensors, ride height sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ride height sensors are configured to measure the right height of the vehicle 10. The ultrasonic sensor may detect static and/or dynamic objects.

The vehicle controller 34 is programmed to receive sensor data from the sensors 40 and includes at least one processor 44 and a non-transitory computer readable storage device or media 46. The processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the vehicle controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10.

Figure 2:
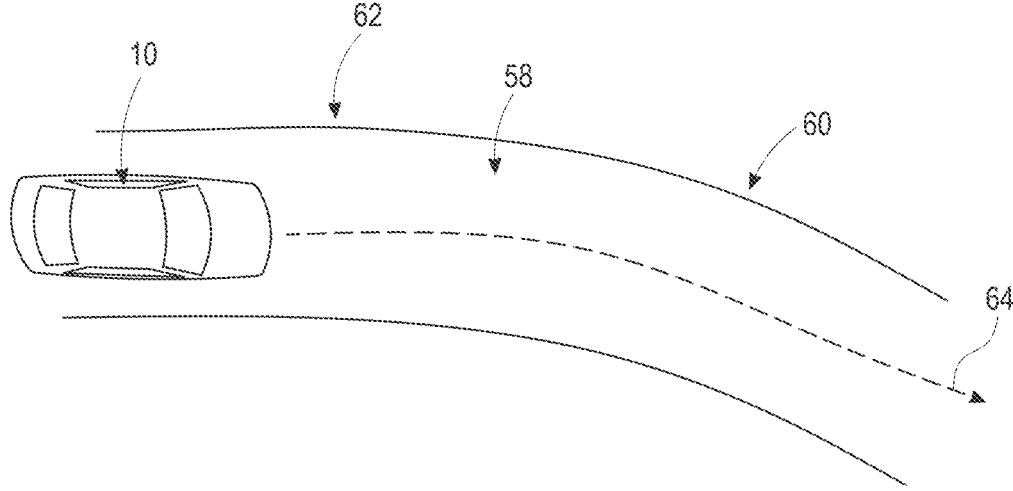
FIG. 2 is a schematic diagram of the vehicle of FIG. 1 traveling along a road.
Figure 3:
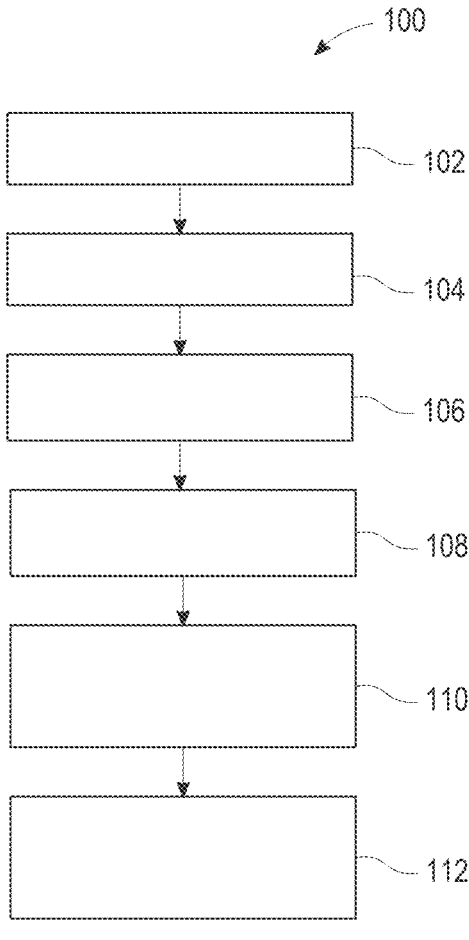
FIG. 3 is a flowchart of a method for predictive variable velocity model-based lateral control.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators to automatically control the components of the vehicle 10 based on the logic, calculations, methods, and/or algorithms. Although a single vehicle controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the vehicle controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2).

The vehicle 10 further includes one or more vehicle actuators 42 that control one or more vehicle features such as, but not limited to, the propulsion system, the transmission system, accelerator pedal, brake pedal, the electronic power steering system 45, and the brake system. As non-limiting examples, the vehicle actuators 42 may be the electronic power steering system 45. The electronic power steering system 45 includes an electric motor 43 to control the steering of the vehicle 10. The vehicle actuators 42 are in communication with the vehicle controller 34. Therefore, the vehicle controller 34 is programmed to control the operation of the vehicle actuators 47. For instance, the vehicle controller 34 is programmed to control the operation of the electric motor 43 of the electronic power steering system 45 to control the steering of the vehicle 10.

The vehicle 10 includes a vehicle body 12, a first or rear axle 14, and a second or front axle 16. The front axle 16 and the rear axle 14 are coupled to the vehicle body 12. Further, each of the front axle 16 and the rear axle 14 are configured to rotate relative to the vehicle body 12. The vehicle 10 further includes one or more first or rear tires 18 coupled to the front axle 16 and one or more second or front tires 20 coupled to the rear axle 16. As a non-limiting examples, the vehicle 10 may include two front tires 20 (e.g., a left front tire and a right front tire) and two rear tires 18 (e.g., a left rear tire and a right rear tire).

A distance 50 from the rear axle 14 to the center of gravity 52 of the vehicle 10 is shown in FIG. 1. A distance 54 from the front axle 16 to the center of gravity 52 of the vehicle 10 is shown in FIG. 1. A distance 56 from the rear axle 14 to the front axle 16 is shown in FIG. 1.

FIG. 2 is a flowchart of a method 100 for predictive variable velocity model-based lateral control. The method 100 determines the speed profile of the vehicle 10 over a predetermined period of time (e.g., sixty seconds). The vehicle 10 may perform collision avoidance steering to avoid collision. When the vehicle 10 enables the collision avoidance steering, the speed of the vehicle 10 may vary (due to driver-induced braking or a system may automatically adjust the speed). As a consequence of the variable speed, the vehicle 10 may start to oscillate within the lane 58 or depart from the lane 58.

With reference to FIG. 2, the oscillation or lane departure described above may occur when the vehicle 10 travels along a road curve 60 of a road 62. The method 100 helps maintain the vehicle 10 traveling along a virtual centerline 64 of the lane 58. The centerline 64 of the lane 58 represents the center of the lane 58.

With reference again to FIG. 2, at block 102, the controller 34 determines the speed profile over a predetermined amount of time (e.g., sixty seconds) while the vehicle 10 travels within the lane 58 of the road 62. The speed profile may be determined based on the inputs from the sensors 40 and/or actuators 42. The predetermined period of time may include a current time and a future time. The speed profile may therefore include the speed of the vehicle 10 at the current time and the speed of the vehicle at a future time. The method 100 is used when the vehicle speed varies. Thus, the speed of the vehicle 10 at the current time is different from the speed of the vehicle at a future time. The controller 34 may determine the speed profile over the predetermined amount of time based on inputs from one or more sensors 40 (e.g., speed sensors, accelerometer, etc.) and/or inputs from actuators 42 (e.g., accelerator pedal or brake pedal). The method 100 then continues to block 104.

At block 104, the controller 34 determines the curvature of a vehicle path along the road curve 60 of a road 62. The controller 34 may determine the curvature of a vehicle path along the road curve 60 of a road 62 based on the curvature of the road curve 60. The controller 34 may determine the curvature of the road curve 60 using inputs from the GNSS transceivers or receivers or other sensors 40. Then, the method 100 proceeds to block 106.

At block 106, the controller 34 determines the impact of the variable speed of the vehicle 10 on the lateral vehicle dynamics. To do so, the controller 34 may use the bicycle model or calibration data obtained by testing the vehicle 10. Then, the method 100 continues to block 108.

At block 108, the controller 34 determines the error (i.e., uncertainty) of a steering angle command using the speed profile and the curvature of the vehicle path along the road curve 60 of the road 62. Specifically, this error of the steering angle command may be determined using the bicycle model, the speed profile of the vehicle 10, and the yaw rate of the vehicle 10. Thus, the controller 34 may determine the yaw rate of the vehicle 10 using, for example, one or more sensors 40 (e.g., yaw-rate sensor) at the current time and/or a future time. The understeer coefficient of the vehicle may be calculated as a function of the yaw rate of the vehicle 10 at the current time and/or the future time (i.e., look-ahead position of the vehicle 10). Then, the method 100 proceeds to block 110.

At block 110, the controller determines (e.g., calculates) the variable velocity feedforward control command using the error on the steering angle command. The variable velocity feedforward control command may be calculated using the following equation:

$$\delta_{FF,\dot{v}} = \Delta v \rho_{ref}\left(v\ K_{us} - \frac{\left(l_f^2 + l_r^2\right)}{2L(\Delta v + v)}\right)$$

$\delta_{FF,\dot{v}}$ is the variable velocity feedforward control command;

$\rho_{ref}$ is the reference curvature of a vehicle path along the road curve 60 of the road 62;

v is a velocity of the vehicle 10;

$\Delta v$ is a velocity difference between a first velocity of the vehicle at a first point in time and a second velocity of the vehicle at a second point in time;

$K_{us}$ is the understeer coefficient of the vehicle;

$l_r$ is a distance from a center of gravity of the vehicle to a rear axle 14 of the vehicle 10;

$l_f$ is a distance from a center of gravity of the vehicle to a front axle 16 of the vehicle 10; and L is a distance from the front axle 16 to the rear axle 14 of the vehicle.

Then, the method 100 continues to block 112. At block 112, the controller 34 compensates for impact of the variable speed at the look-ahead distance (e.g., thirty feet ahead of the current position of the vehicle 10). To do so, the controller 34 uses a Model Predictive Control (MPC) to determine a vehicle path over the predetermined period of time and commands the actuators 42 to actuate so that the vehicle 10 follows the previously determined vehicle path. The MPC is iteratively updated with the variable velocity feedforward control command to compensate for the variable speed. The controller 34 may also use variable velocity feedforward control command the controls the electronic power steering system 45 (including the electric motor 43) to maintain the vehicle 10 traveling along the centerline 68 along the virtual centerline 64 of the lane 58 while the vehicle 10 travels through the road curve 60 of the road 62 at the look-ahead distance. In other words, the controller 34 determines a steering control command using the variable velocity feedforward control command to maintain the vehicle 10 traveling along the center of the lane 58 when the vehicle 10 is traveling along the road curve 60. Also, at block 112, the controller 34 may also command the actuators 42 to adjust the speed of the vehicle 10 over the predetermined period of time to maintain a predetermined headway (e.g., five feet). In the present disclosure, the term "headway" means a distance from the vehicle 10 to another vehicle directly in front of the vehicle 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for vehicle lane centering, comprising:
determining a speed profile of the vehicle over a predetermined period of time while a vehicle moves within a lane of a road, wherein the road has a road curve, and the predetermined period of time includes a current time and a future time;
determining a curvature of a vehicle path along the road curve of the road;
determining an error of a steering angle command using the speed profile and the curvature of the vehicle path along the road curve of the road, wherein the error of the steering angle command is calculated as a function of a yaw rate of the vehicle at the current time to determine an understeer coefficient of the vehicle;
determining a variable velocity feedforward control command using the error on the steering angle command, wherein the variable velocity feedforward control command is calculated using a following equation:

$$\delta_{FF,v} = \Delta v \rho_{ref}\left(v\ K_{us} - \frac{(l_f^2 + l_r^2)}{2L(\Delta v + v)}\right)$$

$\delta_{FF,v}$ is the variable velocity feedforward control command, $\rho_{ref}$ is the curvature of a vehicle path along the road curve of the road, v is a velocity of the vehicle, $\Delta v$ is a velocity difference between a first velocity of the vehicle at a first point in time and a second velocity of the vehicle at a second point in time, $K_{us}$ is the understeer coefficient of the vehicle error on the steering angle command, $l_r$ is a distance from a center of gravity of the vehicle to a rear axle of the vehicle, $l_f$ is a distance from a center of gravity of the vehicle to a front axle of the vehicle, and L is a distance from a front axle to the rear axle of the vehicle; and controlling the vehicle using the variable velocity feedforward control command to maintain the vehicle traveling along a center of a lane when the vehicle is traveling along the road curve, wherein the controller compensates for impact of the variable speed at a look-ahead distance and iteratively updates a Model Predictive Control with the variable velocity feedforward control command to determine a vehicle path over the predetermined period of time.

2. The method of claim 1, further comprising adjusting a speed of the vehicle over the predetermined period of time to maintain a predetermined headway.

3. The method of claim 1, further comprising determining a steering control command using the variable velocity feedforward control command to maintain the vehicle traveling along the center of the lane when the vehicle is traveling along the road curve.

4. A control system for a vehicle, comprising:
a plurality of sensors;
a controller in communication with the plurality of sensors, wherein the controller is programmed to:
determine a speed profile of the vehicle over a predetermined period of time while a vehicle moves within a lane of a road, wherein the road has a road curve, and the predetermined period of time includes a current time and a future time;
determine a curvature of a vehicle path along the road curve of the road;
determine an error of a steering angle command using the speed profile and the curvature of the vehicle path along the road curve of the road, wherein the error of the steering angle command is calculated as a function of a yaw rate of the vehicle at the current time to determine an understeer coefficient of the vehicle;
determine a variable velocity feedforward control command using the error on the steering angle command, wherein the variable velocity feedforward control command is calculated using a following equation:

$$\delta_{FF,v} = \Delta v \rho_{ref}\left(v\ K_{us} - \frac{(l_f^2 + l_r^2)}{2L(\Delta v + v)}\right)$$

$\delta_{FF,v}$ is the variable velocity feedforward control command, $\rho_{ref}$ is the curvature of a vehicle path along the road curve of the road, v is a velocity of the vehicle, $\Delta v$ is a velocity difference between a first velocity of the vehicle at a first point in time and a second velocity of the vehicle at a second point in time, $K_{us}$ is the understeer coefficient of the vehicle error on the steering angle command, $l_r$ is a distance from a center of gravity of the vehicle to a rear axle of the vehicle, $l_f$ is a distance from a center of gravity of the vehicle to a front axle of the vehicle, and L is a distance from a front axle to the rear axle of the vehicle; and
control the vehicle using the variable velocity feedforward control command to maintain the vehicle traveling along a center of a lane when the vehicle is traveling along the road curve, wherein the controller compensates for impact of the variable speed at a look-ahead distance and iteratively updates a Model Predictive Control with the variable velocity feedforward control command to determine a vehicle path over the predetermined period of time.

5. The control system of claim 4, wherein the controller is programmed to adjust a speed of the vehicle over the predetermined period of time to maintain a predetermined headway.

6. The control system of claim 4, further comprising determining a steering control command using the variable velocity feedforward control command to maintain the vehicle traveling along the center of the lane when the vehicle is traveling along the road curve.

7. A vehicle, comprising:

a vehicle body;

a plurality of sensors coupled to the vehicle body;

a controller in communication with the plurality of sensors, wherein the controller is programmed to:

determine a speed profile of the vehicle over a predetermined period of time while a vehicle moves within a lane of a road, wherein the road has a road curve, and the predetermined period of time includes a current time and a future time;

determine a curvature of a vehicle path along the road curve of the road;

determine an error of a steering angle command using the speed profile and the curvature of the vehicle path along the road curve of the road, wherein the error of the steering angle command is calculated as a function of a yaw rate of the vehicle at the current time to determine an understeer coefficient of the vehicle;

determine a variable velocity feedforward control command using the error on the steering angle command, wherein the variable velocity feedforward control command is calculated using a following equation:

$$\delta_{FF,\dot{v}} = \Delta v \rho_{ref}\left(v \; K_{us} - \frac{(l_f^2 + l_r^2)}{2L(\Delta v + v)}\right)$$

$\delta_{FF,\dot{v}}$ is the variable velocity feedforward control command, $\rho_{ref}$ is the curvature of a vehicle path along the road curve of the road, v is a velocity of the vehicle, $\Delta v$ is a velocity difference between a first velocity of the vehicle at a first point in time and a second velocity of the vehicle at a second point in time, $K_{us}$ is the understeer coefficient of the vehicle error on the steering angle command, $l_r$ is a distance from a center of gravity of the vehicle to a rear axle of the vehicle, $l_f$ is a distance from a center of gravity of the vehicle to a front axle of the vehicle, and L is a distance from a front axle to the rear axle of the vehicle; and control the vehicle using the variable velocity feedforward control command to maintain the vehicle traveling along a center of a lane when the vehicle is traveling along the road curve, wherein the controller compensates for impact of the variable speed at a look-ahead distance and iteratively updates a Model Predictive Control with the variable velocity feedforward control command to determine a vehicle path over the predetermined period of time.

8. The vehicle of claim 7, wherein the controller is programmed to adjust a speed of the vehicle over the predetermined period of time to maintain a predetermined headway.

* * * * *